(12) United States Patent
Ahmed et al.

(10) Patent No.: US 11,454,539 B2
(45) Date of Patent: Sep. 27, 2022

(54) VEHICLE LAMP

(71) Applicant: Koito Manufacturing Co., Ltd., Tokyo (JP)

(72) Inventors: Fahin Syed Ahmed, Shizuoka (JP); Takao Muramatsu, Shizuoka (JP); Hitoshi Gotoh, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 274 days.

(21) Appl. No.: 16/842,122

(22) Filed: Apr. 7, 2020

(65) Prior Publication Data

US 2020/0333182 A1 Oct. 22, 2020

(30) Foreign Application Priority Data

Apr. 18, 2019 (JP) .............................. JP2019-079173

(51) Int. Cl.
 *G01J 1/00* (2006.01)
 *G01J 1/42* (2006.01)
 (Continued)

(52) U.S. Cl.
 CPC .......... *G01J 1/4257* (2013.01); *B60Q 11/005* (2013.01); *G07C 5/0808* (2013.01); *G05D 1/0088* (2013.01)

(58) Field of Classification Search
 CPC ..... G01J 1/4257; B60Q 11/005; G07C 5/0808
 See application file for complete search history.

(56) References Cited

U.S. PATENT DOCUMENTS

| 9,045,080 B2 | 6/2015 | Yamamura |
| 2009/0015388 A1* | 1/2009 | Yagi ..................... G02B 26/101 |
| | | 362/465 |

(Continued)

FOREIGN PATENT DOCUMENTS

| CN | 102602337 A | * | 7/2012 |
| CN | 102602337 A | | 7/2012 |

(Continued)

OTHER PUBLICATIONS

An Office Action dated Nov. 17, 2021, issued from the China National Intellectual Property Administration (CNIPA) of Chinese Patent Application No. 202010311115.8 and an EN translation thereof (16 pages).

(Continued)

*Primary Examiner* — Gerald J Sufleta, II
(74) *Attorney, Agent, or Firm* — Venjuris, P.C.

(57) ABSTRACT

A vehicle lamp includes: a first light source configured to irradiate visible light; a second light source configured to emit infrared light; a rotating reflector configured to be rotated while reflecting the visible light and the infrared light, and scan the visible light and the infrared light along a horizontal direction on a virtual vertical screen; a light receiving unit configured to receive the infrared light emitted from the second light source and reflected by a target object; and a controller configured to control an irradiation area of the visible light based on the infrared light received by the receiving unit. When determined that there is an abnormality in at least one of the second light source or the light receiving unit, the controller is configured to control the irradiation area based on the surrounding information of the vehicle obtained from outside the vehicle lamp.

4 Claims, 13 Drawing Sheets

(51) Int. Cl.
    *G07C 5/08*     (2006.01)
    *B60Q 11/00*     (2006.01)
    *G05D 1/00*     (2006.01)

(56) References Cited

U.S. PATENT DOCUMENTS

| | | | |
|---|---|---|---|
| 2010/0309680 A1* | 12/2010 | Akutagawa | F21S 41/321 362/539 |
| 2013/0038736 A1* | 2/2013 | Yamamura | B60R 11/04 348/148 |
| 2014/0042325 A1* | 2/2014 | Yamamura | F21S 41/336 362/231 |
| 2017/0282786 A1* | 10/2017 | Toda | F21S 41/148 |
| 2017/0305329 A1* | 10/2017 | Hoffmann | B60Q 1/143 |
| 2018/0156410 A1* | 6/2018 | Mouri | F21S 41/675 |
| 2018/0180243 A1* | 6/2018 | Na | F21S 41/285 |
| 2018/0340664 A1* | 11/2018 | Yang | F21S 41/365 |
| 2019/0139411 A1* | 5/2019 | Dhull | B60N 2/002 |
| 2019/0143885 A1* | 5/2019 | Sugimoto | B60Q 1/0064 362/466 |
| 2019/0154225 A1* | 5/2019 | Nakazato | F21S 41/36 |
| 2020/0072428 A1* | 3/2020 | Simchak | F21S 41/255 |

FOREIGN PATENT DOCUMENTS

| | | | |
|---|---|---|---|
| CN | 103492228 A | | 1/2014 |
| JP | 2009-154615 A | | 7/2009 |
| JP | 2009154615 A | * | 7/2009 |
| JP | 2018-090089 A | | 6/2018 |
| WO | 2014024385 A | | 2/2014 |

OTHER PUBLICATIONS

The Written Opinion for a French counterpart (FR2003846) of this application, dated Feb. 2, 2022 and English translation thereof (8 pages).

* cited by examiner

VEHICLE LAMP

CROSS-REFERENCE TO RELATED APPLICATIONS

This application is based on and claims priority from Japanese Patent Application No. 2019-079173, filed on Apr. 18, 2019, with the Japan Patent Office, the disclosure of which is incorporated herein in its entirety by reference.

TECHNICAL FIELD

The present disclosure relates to a vehicle lamp used in vehicles such as an automobile.

BACKGROUND

A vehicular illuminating device is disclosed in which visible light from a visible light source and infrared light from an infrared light source are respectively reflected by separate optical members, and the visible light and the infrared light are irradiated to the front of the vehicle (see, e.g., Japanese Patent Laid-Open Publication No. 2009-154615).

SUMMARY

In such a vehicular illuminating device, there is room for improvement in the accuracy of light distribution pattern formation when an abnormality occurs in the device.

Therefore, the present disclosure is to provide a vehicle lamp capable of forming an appropriate visible light distribution pattern even when an abnormality occurs in an infrared light source or an infrared light receiving unit.

In order to solve the above problem, a vehicle lamp of the present disclosure includes: a first light source configured to irradiate visible light to the surrounding of a vehicle; a second light source configured to emit infrared light to obtain surrounding information of the vehicle; a rotating reflector configured to be rotated while reflecting the visible light irradiated from the first light source and the infrared light irradiated from the second light source, and to scan the visible light and the infrared light along a horizontal direction on a virtual vertical screen disposed at a predetermined distance from the vehicle; a light receiving unit configured to receive the infrared light emitted from the second light source and reflected by a target object in the surrounding of the vehicle; and a controller configured to control an irradiation area of the visible light emitted from the first light source based on the infrared light received by the light receiving unit. When it is determined that there is an abnormality in at least one of the second light source or the light receiving unit, the controller is configured to control the irradiation area based on vehicle surrounding information obtained from outside the vehicle lamp.

With the above configuration, it is possible to provide a vehicle lamp capable of forming an appropriate visible light distribution pattern, even when an abnormality occurs in a second light source or a light receiving unit.

Further, in the vehicle lamp of the present disclosure, when it is determined that there is an abnormality in at least one of the second light source and the light receiving unit, the controller may control the irradiation area such that a cut off line formed on the virtual vertical screen by the visible light to become blurred.

With the above configuration, it is possible to prevent the occurrence of glare on, for example, oncoming vehicle, even when the sensing of a target object becomes inaccurate due to the occurrence of an abnormality.

Further, in the vehicle lamp of the present disclosure, when it is determined that there is an abnormality in at least one of the second light source or the light receiving unit, the controller may be configured to notify abnormality information to a vehicle controller configured to control the entire vehicle.

With the above configuration, the abnormality information of the second light source and/or the light receiving unit may be notified to the vehicle controller, and the abnormality information may be reflected on the control of the entire vehicle.

Further, in the vehicle lamp of the present disclosure, when it is determined that there is an abnormality in the first light source, the controller may stop irradiation of the visible light from the first light source and stop irradiation of the infrared light from the second light source.

With the above configuration, when there is an abnormality in the first light source that emits visible light, it is possible to prevent the visible light from being irradiated to the front of the vehicle with an inappropriate light distribution pattern or to prevent the accuracy of sensing by the infrared light from lowering, and thus, fail-safe may be achieved.

According to the present disclosure, it is possible to provide a vehicle lamp capable of forming an appropriate visible light distribution pattern even when an abnormality occurs in an infrared light source or an infrared light receiving unit.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

Hereinafter, embodiments of the present disclosure will be described with reference to the drawings. Identical or corresponding components, members, and processes in each of the drawings will be denoted by the same symbols, and overlapping descriptions thereof will be appropriately omitted. Further, the embodiments are not intended to limit the present disclosure thereto, but are merely exemplary. All features described in the embodiments or combinations thereof may not be essential for the present disclosure.

Figure 1:
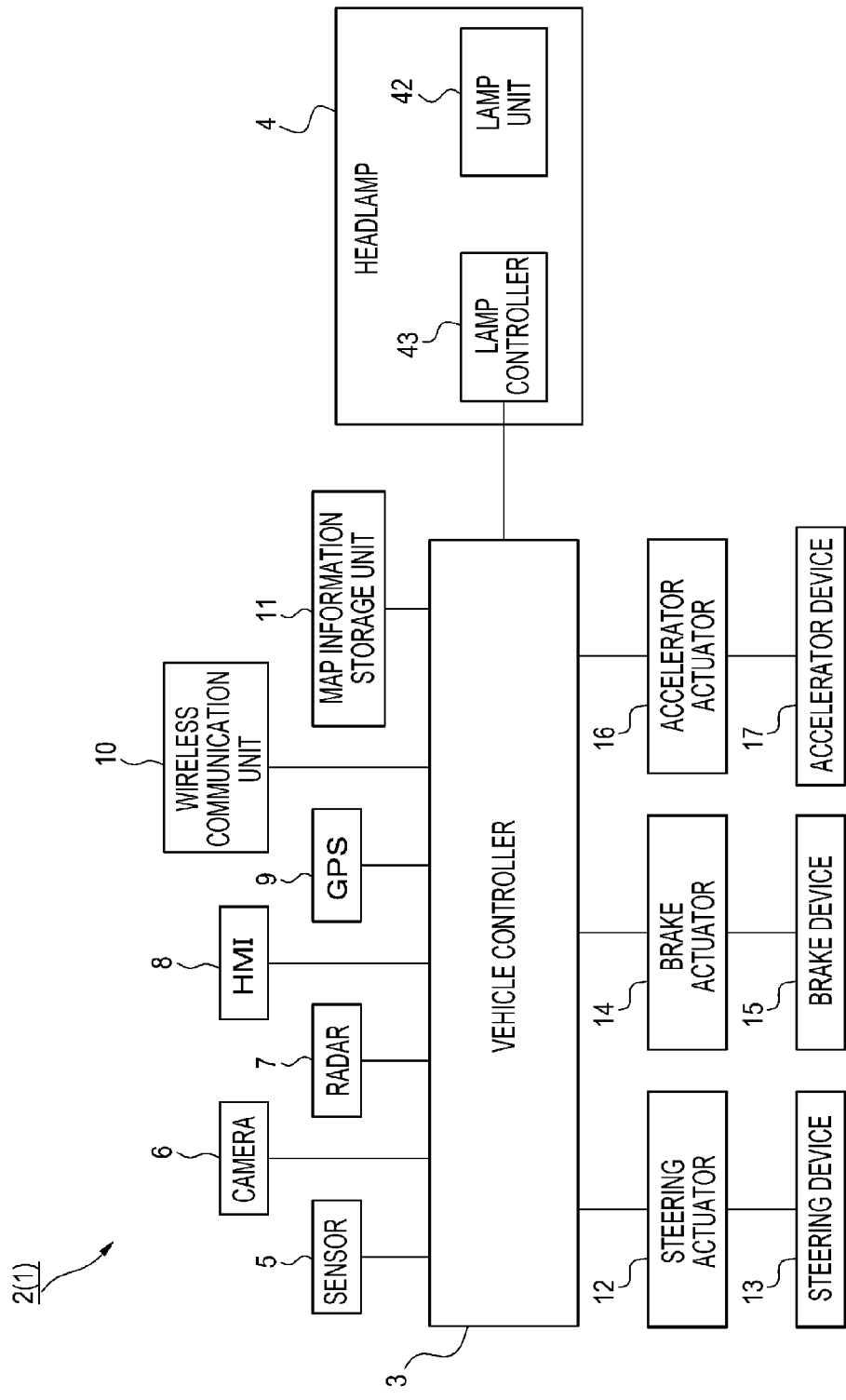
FIG. 1 is a block diagram illustrating a configuration of a vehicle system on which a vehicle lamp according to an exemplary embodiment of the present disclosure is mounted.

FIG. 1 illustrates a block diagram of a vehicle system 2 mounted on a vehicle 1.

As illustrated in FIG. 1, the vehicle system 2 according to the present embodiment includes a vehicle controller 3, a head lamp 4, a sensor 5, a camera 6, a radar 7, a human machine interface (HMI) 8, a global positioning system (GPS) 9, a wireless communication unit 10, and a map information storage unit 11. Further, the vehicle system 2 includes a steering actuator 12, a steering device 13, a brake actuator 14, a brake device 15, an accelerator actuator 16, and an accelerator device 17.

The vehicle controller 3 is configured to control traveling of the vehicle 1. The vehicle controller 3 is configured by, for example, an electronic control unit (ECU). The electronic control unit includes a micro controller including a processor and a memory, and other electronic circuits (e.g., transistors). The processor is, for example, a central processing unit (CPU), a micro processing unit (MPU) and/or a graphics processing unit (GPU). The memory includes a read only memory (ROM) in which various vehicle control programs (e.g., automatic driving artificial intelligence (AI) program) are stored, and a random access memory (RAM) in which various vehicle control data is temporarily stored. The processor is configured to develop programs designated from the various vehicle control programs stored in the ROM on the RAM to execute various processings in cooperation with the RAM.

The headlamp 4 is an illuminating device mounted on the front portion of the vehicle 1, and includes a lamp unit 42 that irradiates light toward the road around the vehicle 1, and a lamp controller 43 (example of the lamp controller). The detailed configurations of the lamp unit 42 and the lamp controller 43 will be described later.

For example, the vehicle controller 3 generates an instruction signal for controlling turning-on/off of the lamp unit 42 when predetermined conditions are satisfied, and sends the instruction signal to the lamp controller 43. The lamp controller 43 controls the turning-on/off of the lamp unit 42 based on the received instruction signal.

The sensor 5 includes an acceleration sensor, a speed sensor, and a gyro sensor. The sensor 5 is configured to detect the traveling state of the vehicle 1, and output traveling state information to the vehicle controller 3. The sensor 5 may further include, for example, a seating sensor that detects whether a driver is sitting on a driver's seat, a face direction sensor that detects a direction of a driver's face, an outside weather sensor that detects an outside weather condition, and a person sensing sensor that detects whether a person is in the inside of the vehicle. The sensor 5 may include an illuminance sensor that detects illuminance of the surrounding environment of the vehicle 1.

The camera 6 is, for example, a camera that includes a capture device such as a charge-coupled device (CCD) or a complementary metal-oxide semiconductor (CMOS). Capture of the camera 6 is controlled based on a signal sent from the vehicle controller 3. For example, the camera 6 may capture an image with a frame rate matched to a frequency at which the lamp unit 42 is turned ON/OFF. Therefore, the camera 6 may obtain both the image when the lamp unit 42 is turned ON and the image when the lamp unit is turned OFF.

The radar 7 is a millimeter-wave radar, a microwave radar, or a laser radar. The radar 7 may include a light detection and ranging or a laser imaging detection and ranging (LiDAR). The LiDAR is a sensor that generally emits invisible light to the front, and obtains information such as a distance to an object, a shape of the object, and a material of the object, based on the emitted light and the returned light. The camera 6 and the radar 7 are configured to detect surrounding environment (e.g., other vehicles, pedestrians, road shapes, traffic signs, or obstacles) of the vehicle 1, and output the surrounding information to the vehicle controller 3.

The HMI 8 is configured by an input unit that receives an input operation from a driver, and an output unit that outputs traveling information to the driver. The input unit includes, for example, a steering wheel, an accelerator pedal, a brake pedal, and a driving mode switching switch that switches a driving mode of the vehicle 1. The output unit is a display that displays various traveling information.

The GPS 9 is configured to obtain current position information of the vehicle 1, and output the obtained current position information to the vehicle controller 3. The wireless communication unit 10 is configured to receive information (e.g., traveling information) about other vehicles around the vehicle 1 from the other vehicles, and send information (e.g., traveling information) about the vehicle 1 to the other vehicles (vehicle-to-vehicle communication). Further, the wireless communication 10 is configured to receive infrastructure information from infrastructure facilities such as a signal apparatus and a sign light, and send traveling information of the vehicle 1 to the infrastructure facilities (road-to-vehicle communication). The map information storage unit 11 is an external storage device such as a hard disk in which map information is stored, and is configured to output the map information to the vehicle controller 3.

When the vehicle 1 is traveling in an automatic driving mode, the vehicle controller 3 automatically generates at least one of a steering control signal, an accelerator control signal, or a brake control signal based on traveling state information, surrounding environment information, current position information, or map information. The steering actuator 12 is configured to receive the steering control signal from the vehicle controller 3, and to control the steering device 13 based on the received steering control signal. The brake actuator 14 is configured to receive the brake control signal from the vehicle controller 3, and to control the brake device 15 based on the received brake control signal. The accelerator actuator 16 is configured to receive the accelerator control signal from the vehicle controller 3, and to control the accelerator device 17 based on the received steering control signal. As described above, in the automatic driving mode, the traveling of the vehicle 1 is automatically controlled by the vehicle system 2.

Meanwhile, when the vehicle 1 is traveling in a manual driving mode, the vehicle controller 3 generates the steering control signal, the accelerator control signal, and the brake control signal according to the manual operation of a driver on the accelerator pedal, the brake pedal, and the steering wheel. As described above, in the manual driving mode, the steering control signal, the accelerator control signal, and the brake control signal are generated by the manual operation of a driver, and thus, the traveling of the vehicle 1 is controlled by the driver.

Subsequently, a driving mode of the vehicle 1 will be described. The driving mode is constituted by an automatic driving mode and a manual driving mode. The automatic driving mode is constituted by a fully automatic driving mode, an advanced driving support mode, and a driving support mode. In the fully automatic driving mode, the vehicle system 2 automatically performs all traveling control of the steering control, the brake control, and the accelerator control, and the driver is not in a state where the vehicle 1 can be driven. In the advanced driving support mode, the vehicle system 2 automatically performs all traveling control of the steering control, the brake control, and the accelerator control, and the driver is in a state where the vehicle 1 can be driven, but the driver does not drive the vehicle 1. In the driving support mode, the vehicle system 2 automatically performs a part of traveling control among the steering control, the brake control, and the accelerator control, and the driver drives the vehicle 1 under the driving support of the vehicle system 2. Meanwhile, in the manual driving mode, the vehicle system 2 does not automatically perform the traveling control, and the driver drives the vehicle 1 without the driving support of the vehicle system 2.

Further, the driving mode of the vehicle 1 may be switched by operating the driving mode switching switch. In this case, the vehicle controller 3 switches the driving mode of the vehicle 1 among the four driving modes (fully automatic driving mode, advanced driving support mode, driving support mode, and manual driving mode) according to the operation of the driver on the driving mode switching switch. Further, the driving mode of the vehicle 1 may be automatically switched based on information on a travelable section in which the automatic driving vehicle is allowed to travel or a traveling prohibited section in which the traveling of the automatic driving vehicle is prohibited, or information on outside weather condition. In this case, the vehicle controller 3 switches the driving mode of the vehicle 1 based on such information. The driving mode of the vehicle 1 may be automatically switched by using the seating sensor or the face direction sensor. In this case, the vehicle controller 3 switches the driving mode of the vehicle 1 based on the output signal from the seating sensor or the face direction sensor.

Figure 2:
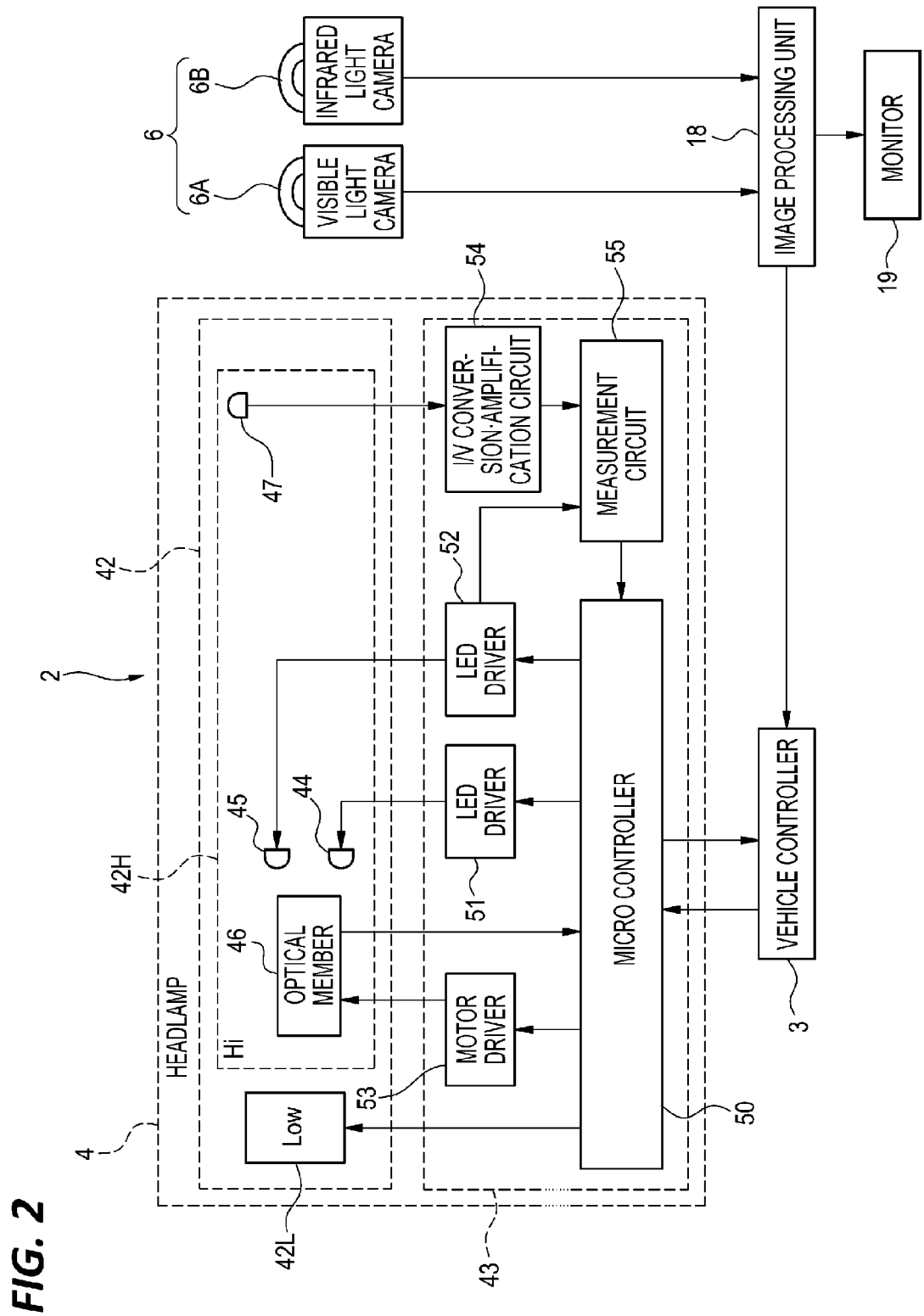
FIG. 2 is a block diagram schematically illustrating a configuration of a portion of the vehicle system according to the present embodiment.

Subsequently, a specific configuration of the vehicle system 2 according to the present embodiment will be described with reference to FIG. 2. FIG. 2 is a block diagram schematically illustrating a configuration of a portion of the vehicle system 2. The headlamp 4 mounted on the vehicle system 2 is provided on the left side and the right side of the front portion of the vehicle, respectively, but for simplification of the drawing, FIG. 2 illustrates only the left side headlamp of the left and right headlamps.

As illustrated in FIG. 2, the vehicle system 2 according to the present embodiment includes, as the camera 6, a visible light camera 6A capable of capturing the surrounding of the vehicle 1 with visible light, and an infrared camera (infrared light camera) 6B capable of capturing the surrounding of the vehicle 1 with infrared light. Instead of providing the visible light camera 6A and the infrared camera 6B, a single camera using a capture device capable of simultaneously capturing a color image and an infrared image using both visible light and infrared light may be provided. Further, the vehicle system 2 includes an image processing unit 18 and a monitor 19. The infrared camera 6B is a camera capable of photographing around the vehicle particularly even at night by detecting infrared rays (infrared light). The image processing unit 18 processes a picture photographed by the visible camera 6A or the infrared camera 6B, and sends the processed picture signal to the vehicle controller 3 or the monitor 19.

The lamp unit 42 of the headlamp 4 includes a low beam lamp unit 42L that forms a low beam light distribution pattern, and a high beam lamp unit 42H (an example of the vehicle lamp) that forms a high beam light distribution pattern. The low beam lamp unit 42L is a parabolic type or a projector type lamp unit. The low beam lamp unit 42L uses, as a light source, an incandescent lamp having a filament such as a halogen lamp, a high intensity discharge (HID) lamp such as a metal halide lamp, or a light emitting diode (LED).

The high beam lamp unit 42H includes a visible light source 44 (an example of the first and third light sources), an infrared light source 45 (an example of the second light source), an optical member 46, and a photo diode 47 (an example of the light receiving unit).

The lamp controller 43 of the headlamp 4 is configured by an electronic control unit (ECU), and is configured to set an illuminating state of the lamp unit 42 to a predetermined illuminating state according to information on the automatic driving of the vehicle 1. The illuminating state mentioned above includes, for example, turning-on/off of each light emitting element that constitutes the lamp unit 42, and a blinking cycle. The lamp controller 43 is electrically connected to a power supply (not illustrated), and includes a micro controller 50 includes processors such as a CPU or an MPU, and memories such as a ROM and a RAM, LED drivers 51 and 52, a motor driver 53, a current-voltage conversion•amplification circuit 54 for the photo diode 47, and a measurement circuit 55. The LED drivers 51 and 52 are drivers configured to respectively drive each light emitting diode (LED) that constitutes the visible light source 44 and the infrared light source 45. The motor driver 53 is a driver configured to drive the optical member 46 (specifically, a rotating reflector 65 described later). The current-voltage conversion•amplification circuit 54 is a circuit configured to convert a current signal (sensor signal) output from the photo diode 47 into a voltage signal, and to amplify the voltage signal. The measurement circuit 55 receives a drive signal of the infrared light source 45 from the LED driver 52 that drives the infrared light source 45, and receives a signal obtained by converting the current signal from the photo diode 47 into the voltage signal by the current-voltage conversion•amplification circuit 54. Then, from these received signals, the measurement circuit 55 measures the difference between a light emitting timing of the infrared light from the infrared light source 45 and a light receiving timing of the reflected light of the infrared light by the photo diode 47, and sends the result to the micro controller 50. The micro controller 50 controls these drivers 51 to 53, or each of the circuits 54 and 55, respectively. In the present embodiment, the vehicle controller 3 and the lamp controller 43 are provided as separated components, but may be integrally configured. That is, the lamp controller 43 and the vehicle controller 3 may be configured by a single electronic control unit.

Figure 3:
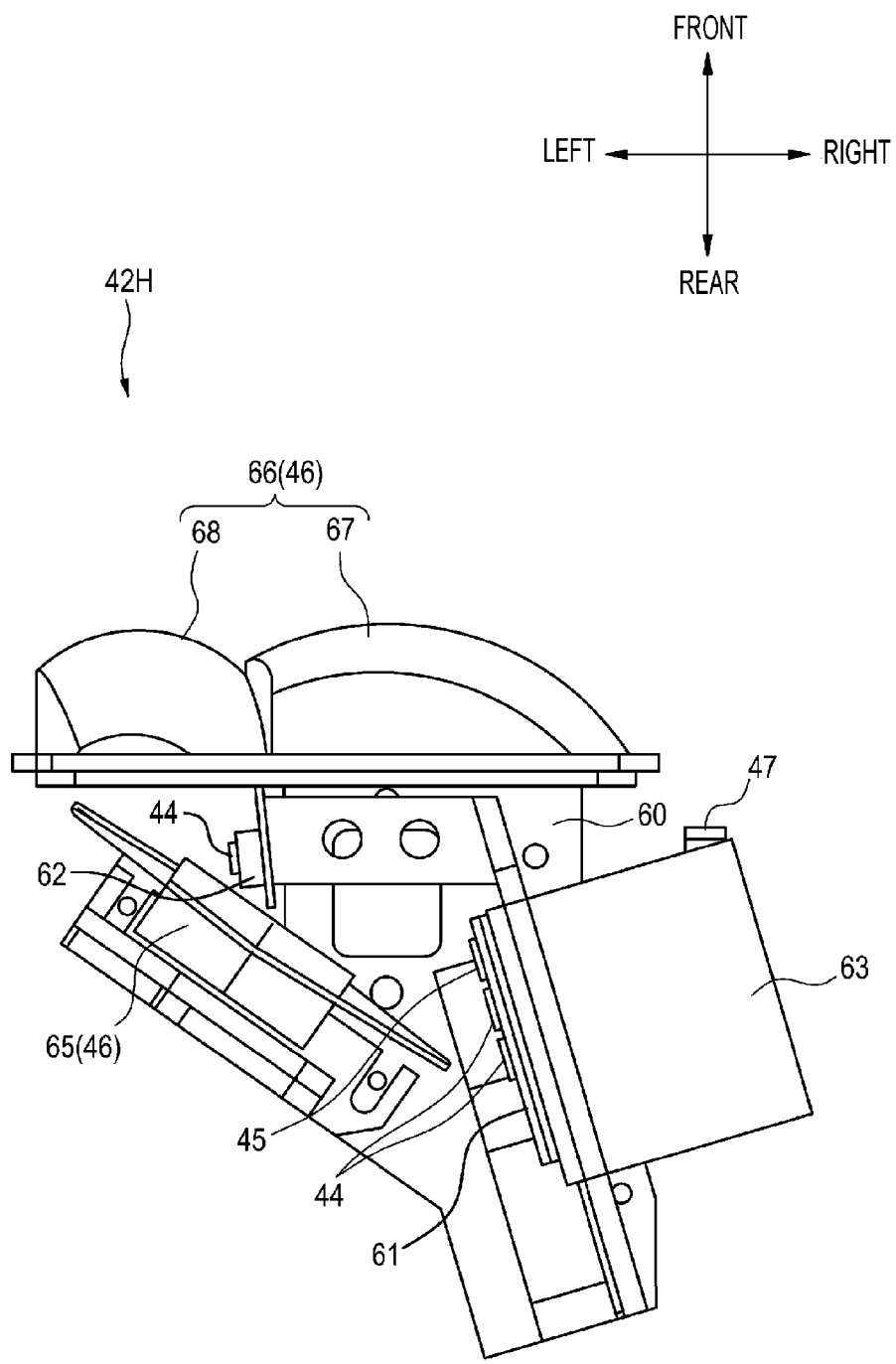
FIG. 3 is a top view of a high beam lamp unit according to the present embodiment.
Figure 4:
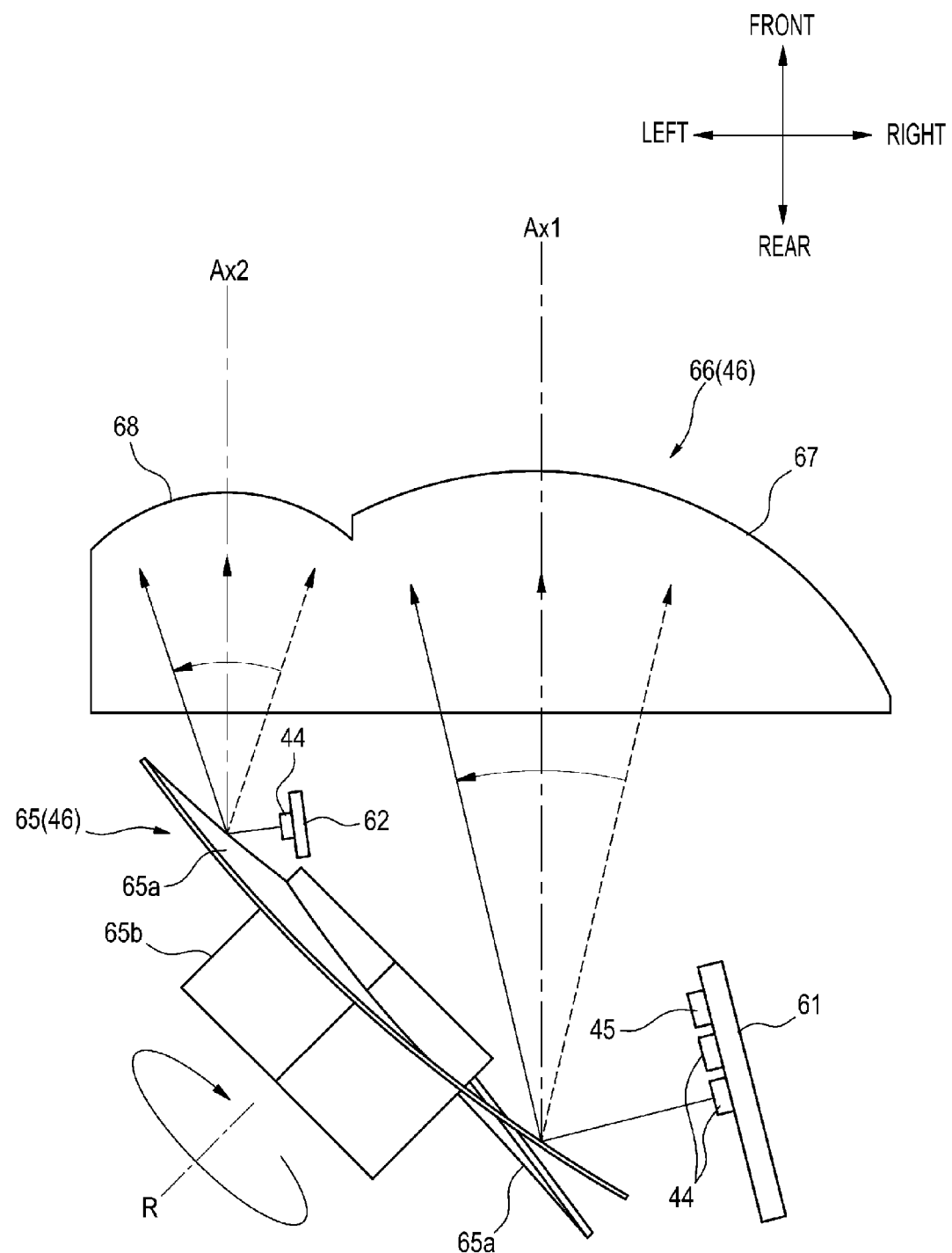
FIG. 4 is an enlarged view of a portion of the high beam lamp unit in FIG. 3.

FIG. 3 is a top view of the high beam lamp unit 42H. FIG. 4 is an enlarged view of a portion of the high beam lamp unit 42H.

As illustrated in FIG. 3, the high beam lamp unit 42H includes a bracket 60 for mounting each component. The bracket 60 is provided on a housing (not illustrated) of the high beam lamp unit 42H. A first wiring substrate 61 provided with a portion of the light source 44 and the infrared light source 45 is attached to the bracket 60. A control box 63 in which components of the lamp controller 43 are accommodated is disposed on the right side of the first wiring substrate 61. Further, a second wiring substrate 62 provided with another portion of the visible light source 44 is attached to a place in the bracket 60 separated from a place where the first wiring substrate 61 is attached. Further, the photo diode 47 is disposed on a portion (here, the lamp front side) of the control box 63.

As illustrated in FIGS. 3 and 4, the rotating reflector 65 that is one component of the optical member 46 is attached at a position facing the first wiring substrate 61 and the second wiring substrate 62 on the bracket 60. A lens 66 that is another component of the optical member 46 is attached to the bracket 60. The lens 66 is provided on the lamp front side with respect to the rotating reflector 65. The lens 66 is constituted by a first lens 67 illustrated on the right side in FIGS. 3 and 4, and a second lens 68 formed continuously with the first lens 67 on the left side of the first lens 67. The first lens 67 and the second lens 68 are configured as a plano-convex aspheric lens having a convex front surface and a flat rear surface, respectively. Light emitted from the visible light source 44 and the infrared light source 45 is reflected by the rotating reflector 65, transmits the first lens 67 or the second lens 68, and irradiated to the front of the lamp.

The rotating reflector 65 is rotated in one direction around a rotation axis R by a motor driver 53 (see FIG. 2). The rotating reflector 65 is configured to reflect the visible light emitted from the visible light source 44 while being rotated, and to form a desired light distribution pattern in front of the lamp. Further, the rotating reflector 65 is configured to reflect the infrared light emitted from the infrared light source 45 while being rotated to irradiate to the front of the lamp.

In the rotating reflector 65, two blades 65a having a same shape and serving as reflective surfaces are provided around a cylindrical rotating portion 65b. The rotation axis R of the rotating reflector 65 is oblique to an optical axis Ax1 of the first lens 67 and an optical axis Ax2 of the second lens 68. The blade 65a of the rotating reflector 65 has a twisted shape so that angles formed between the optical axes Ax1 and Ax2 and the reflective surface are changed along the circumferential direction around the rotation axis R. Therefore, the blade 65a reflects the light emitted from the visible light source 44 or the infrared light source 45 while being rotated, and thus, it is possible to scan using light from each light source.

Figure 5:
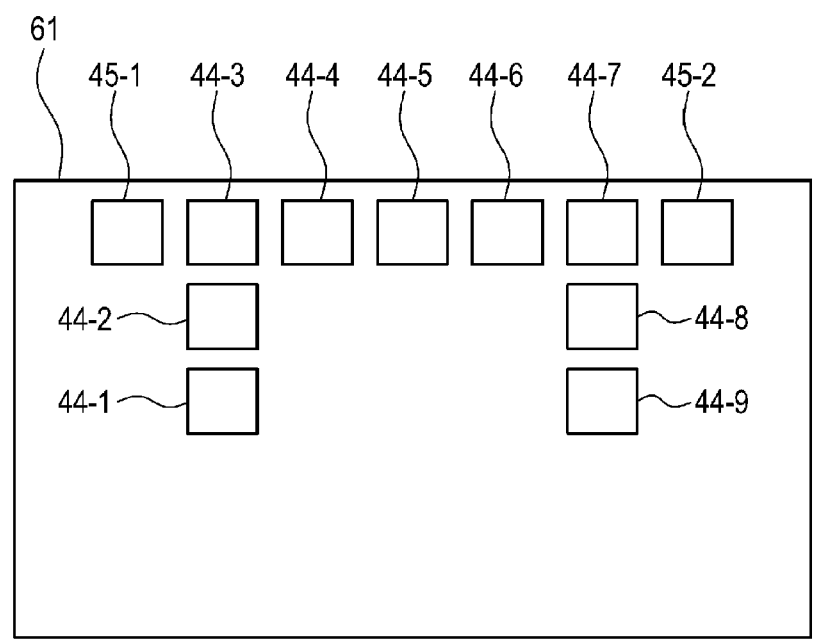
FIG. 5 is a front view of a first wiring substrate provided in the high beam lamp unit.
Figure 6:
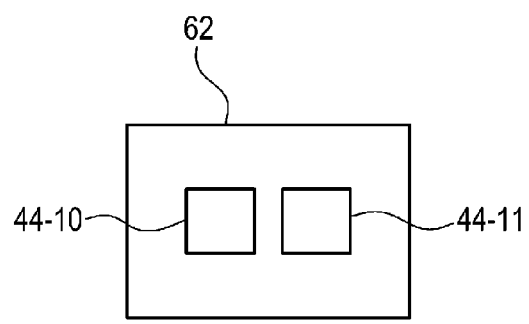
FIG. 6 is a front view of a second wiring substrate provided in the high beam lamp unit.

FIG. 5 is a front view of the first wiring substrate 61, and FIG. 6 is a front view of the second wiring substrate 62.

As illustrated in FIG. 5, a plurality (in the example, nine) of light emitting elements (hereinafter, referred to as "visible light LEDs") 44-1 to 44-9 capable of emitting visible light is disposed on the first wiring substrate 61 as the visible light sources 44. The visible light LEDs 44-1 to 44-9 are disposed to form an inverted U shape in order from the visible light LED 44-1 in the front view of the first wiring substrate 61. A light condensed portion in the high beam light distribution pattern is formed by light emitted from these visible light LEDs 44-1 to 44-9.

Further, a plurality (in the example, two) of infrared light emitting elements (hereinafter, referred to as "IR-LEDs") 45-1 and 45-2 capable of emitting infrared light is disposed on the first wiring substrate 61 as the infrared light sources 45. The IR-LED 45-1 is disposed on the left side of the visible light LED 44-3 in the front view of the first wiring substrate 61. The IR-LED 45-2 is disposed on the right side of the visible light LED 44-7 in the front view of the first wiring substrate 61.

As illustrated in FIG. 6, a plurality (in the example, two) of light emitting elements 44-10 and 44-11 capable of emitting visible light is disposed in parallel on the second wiring substrate 62 as the visible light sources 44. A diffusion portion in the high beam light distribution pattern is formed by light emitted from these visible light LEDs 44-10 and 44-11.

Each of the visible light LEDs 44-1 to 44-11 as the visible light source 44 is constituted by, for example, a white LED capable of irradiating visible light. Instead of an LED, a semiconductor light emitting element such as an EL element or an LD element may be used as the visible light source 44 and the infrared light source 45. In particular, for controlling a part of a high beam light distribution pattern (will be described later) to be non-irradiated, a light source able to be turned ON/OFF with high accuracy in a short time may be used.

The first lens 67 on the right side of the lens 66 is disposed at a position where the invisible light emitted from the visible light LEDs 44-1 to 44-9 disposed on the first wiring substrate 61 and reflected by the rotating reflector 65, and the infrared light emitted from the IR-LEDs 45-1 and 45-2 and reflected by the rotating reflector 65 may be transmitted. That is, the visible light and the infrared light for forming the light condensed portion of the high beam light distribution pattern are transmitted the first lens 67 and irradiated to the front of the lamp. Further, the second lens 68 on the left side of the lens 66 is disposed at a position where the invisible light emitted from the visible light LEDs 44-10 and 44-11 disposed on the second wiring substrate 62 and reflected by the rotating reflector 65 may be transmitted. That is, the visible light for forming the diffusion portion of the high beam light distribution pattern is transmitted the second lens 68 and irradiated to the front of the lamp. A shape of the lens 66 may be appropriately selected according to light distribution characteristics such as a required light distribution pattern or illuminance distribution. Instead of an aspheric lens, for example, a free curved surface lens may be used.

Figure 7:
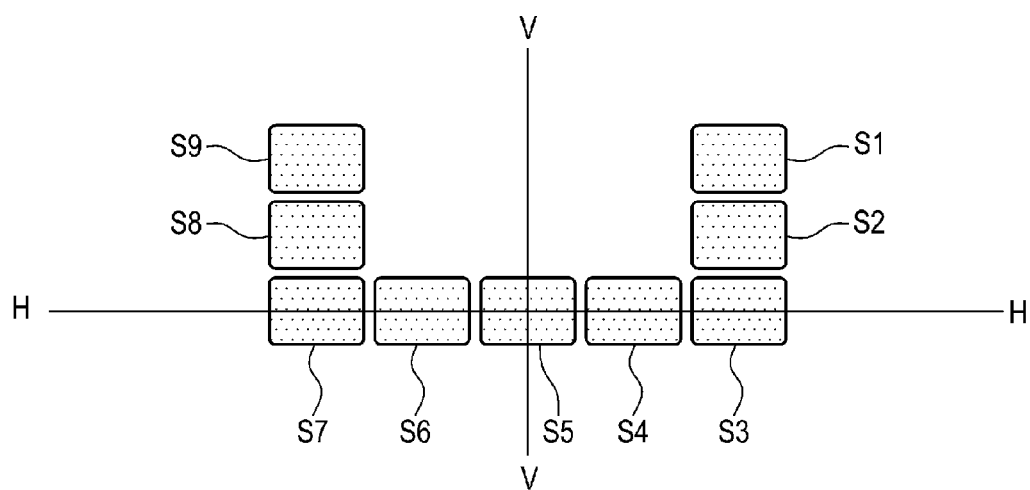
FIG. 7 is a view illustrating an image of spot light formed on a virtual vertical screen by visible light irradiated from each visible light emitting element provided on the first wiring substrate.
Figure 8:
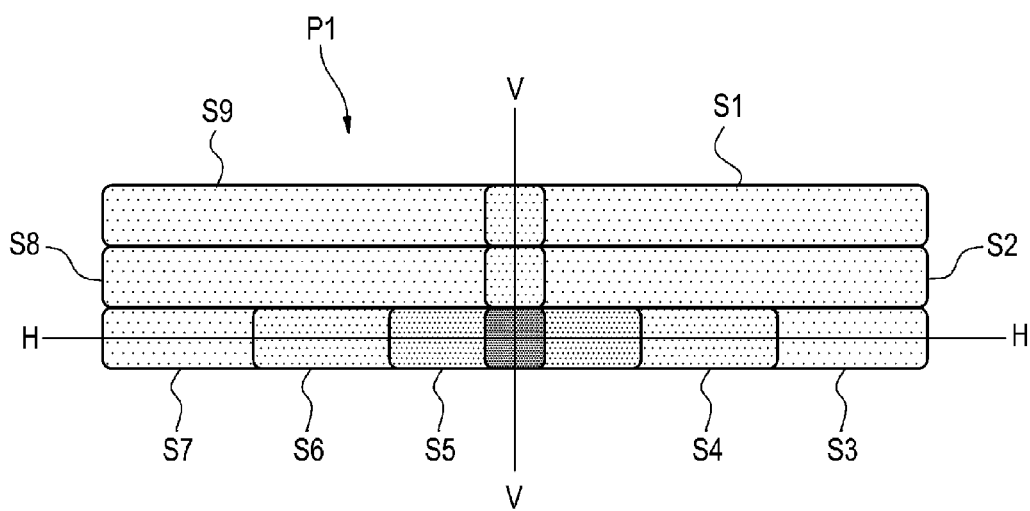
FIG. 8 is a view illustrating a light distribution pattern on the virtual vertical screen in a state where the visible light irradiated from each visible light emitting element provided on the first wiring substrate is scanned by rotation of a rotating reflector.

FIG. 7 is a view illustrating images of spot light formed on a virtual vertical screen disposed at a position, for example, 25 m ahead of the vehicle, by visible light irradiated from each of the visible light LEDs 44-1 to 44-9 provided on the first wiring substrate 61. FIG. 8 is a view illustrating a light distribution pattern P1 on the virtual vertical screen in a state where the visible light irradiated from each of the visible light LEDs 44-1 to 44-9 is scanned by the rotation of the rotating reflector 65.

The visible light emitted from each of the visible light LEDs 44-1 to 44-9 is reflected by the rotating reflector 65, is inverted up and down and left and right by transmitting the first lens 67, and forms the images of the spot light illustrated in FIG. 7 on the virtual vertical screen. In FIG. 7, an image S1 is an image of the spot light irradiated from the visible light LED 44-1, an image S2 is an image of the spot light irradiated from the visible light LED 44-2, an image S3 is an image of the spot light irradiated from the visible light LED 44-3, an image S4 is an image of the spot light irradiated from the visible light LED 44-4, an image S5 is an image of the spot light irradiated from the visible light LED 44-5, an image S6 is an image of the spot light irradiated from the visible light LED 44-6, an image S7 is an image of the spot light irradiated from the visible light LED 44-7, an image S8 is an image of the spot light irradiated from the visible light LED 44-8, and an image S9 is an image of the spot light irradiated from the visible light LED 44-9. The images S1 to S9 are irradiated to be disposed in an U shape on the virtual vertical screen. Among them, the images S3, S4, S5, S6, and S7 are irradiated on a horizontal line H-H on the virtual vertical screen.

When the images S1 to S9 of the spot light of the visible light emitted from each of the visible light LEDs 44-1 to 44-9 are scanned in the left and right direction by the rotation of the rotating reflector 65, the light distribution pattern P1 illustrated in FIG. 8 is formed. The light distribution pattern P1 is formed as the light condensed portion of the high beam light distribution pattern described later. In the light distribution pattern P1, the illuminance is particularly high at a place where the visible light emitted from the plurality of visible light LEDs is irradiated in an overlapping manner. Specifically, the light distribution pattern P1 is formed such that a place where a vertical line V-V and the horizontal line on the virtual vertical screen intersect with each other has the highest illuminance.

Figure 9:
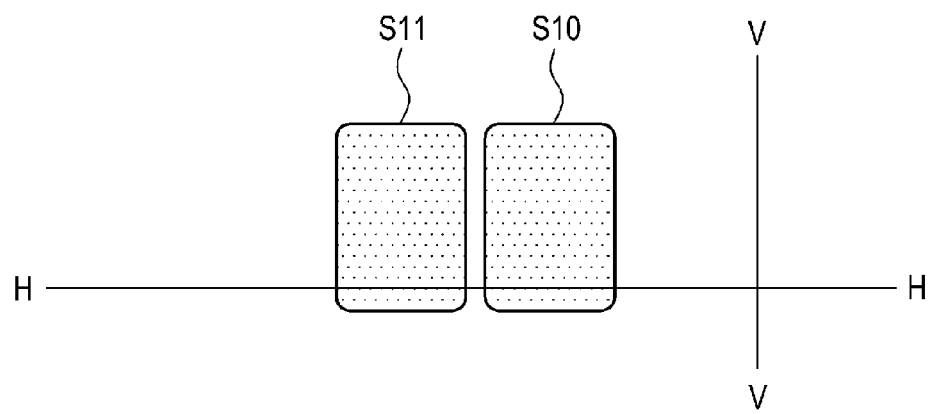
FIG. 9 is a view illustrating an image of spot light formed on a virtual vertical screen by visible light irradiated from each visible light emitting element provided on the second wiring substrate.
Figure 10:
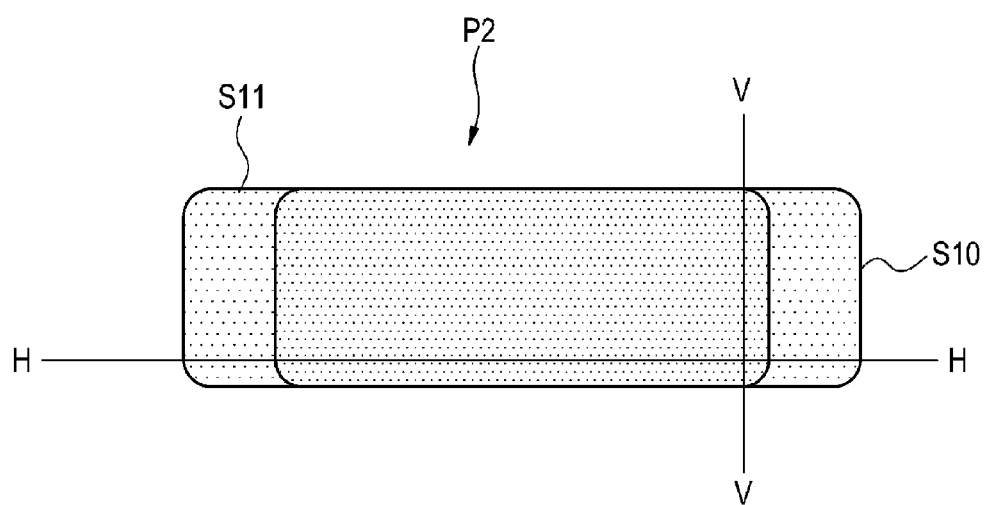
FIG. 10 is a view illustrating a light distribution pattern formed on the virtual vertical screen in a state where the visible light irradiated from each visible light emitting element provided on the second wiring substrate is scanned by rotation of the rotating reflector.

FIG. 9 is a view illustrating images of spot light formed on the virtual vertical screen by visible light irradiated from each of the visible light LEDs 44-10 and 44-11 provided on the second wiring substrate 62, and FIG. 10 is a view illustrating a light distribution pattern P2 on the virtual vertical screen in a state where the visible light irradiated from each of the visible light LEDs 44-10 and 44-11 is scanned by the rotation of the rotating reflector 65.

The visible light emitted from each of the visible light LEDs 44-10 and 44-11 is reflected by the rotating reflector 65, is inverted up and down and left and right by transmitting the second lens 68, and forms the image of the spot light illustrated in FIG. 9 on the virtual vertical screen. In FIG. 9, the image S10 is an image of the spot light irradiated from the visible light LED 44-10, and the image S11 is an image of the spot light irradiated from the visible light LED 44-11. The size of the images S10 and S11 is formed to be larger than the size of the images S1 to S9 of the spot light of the visible light emitted from each of the visible light LEDs 44-1 to 44-9 illustrated in FIG. 7. The images S10 and S11 formed by the visible light LEDs 44-10 and 44-11 mounted on the left side headlamp are irradiated in parallel along the horizontal ling H-H on the left side of the vertical line V-V on the virtual vertical screen. Although not illustrated, the images S10 and S11 formed by the visible light LEDs 44-10 and 44-11 mounted on the right side headlamp are irradiated in parallel along the horizontal ling H-H on the right side of the vertical line V-V on the virtual vertical screen.

When the images S10 and S11 of the spot light of the visible light emitted from the visible light LEDs 44-10 and 44-11 are scanned in the left and right direction by the rotation of the rotating reflector 65, the light distribution pattern P2 illustrated in FIG. 10 is formed. The light distribution pattern P2 is formed as a portion of the diffusion portion of the high beam light distribution pattern described later. As described above, since the images S10 and S11 formed by the visible light LEDs 44-10 and 44-11 mounted on the left side headlamp are irradiated on the left side of the vertical line V-V on the virtual vertical screen, the light distribution pattern P2 that forms a portion of the diffusion portion is formed on a portion on the left side of the irradiation area of the light distribution pattern P1 forming the light condensed portion. Although not illustrated, since the images S10 and S11 formed by the visible light LEDs 44-10 and 44-11 mounted on the right side headlamp are irradiated on the right side of the vertical line V-V on the virtual vertical screen, the other portion of the diffusion portion is formed on a portion on the right side of the light distribution pattern P1 for the light condensed portion.

As described above, a light distribution for the diffusion portion is formed by combining the light distributions (light distribution pattern P2) of the visible light LEDs 44-10 and 44-11 of the left side headlamp and the light distributions of the visible light LEDs 44-10 and 44-11 on the right side headlamp. Then, a high beam light distribution pattern illustrated in FIG. 11 is formed by combining the light distribution pattern P1 for the light condensed portion and the light distribution pattern for the diffusion portion.

Figure 11:
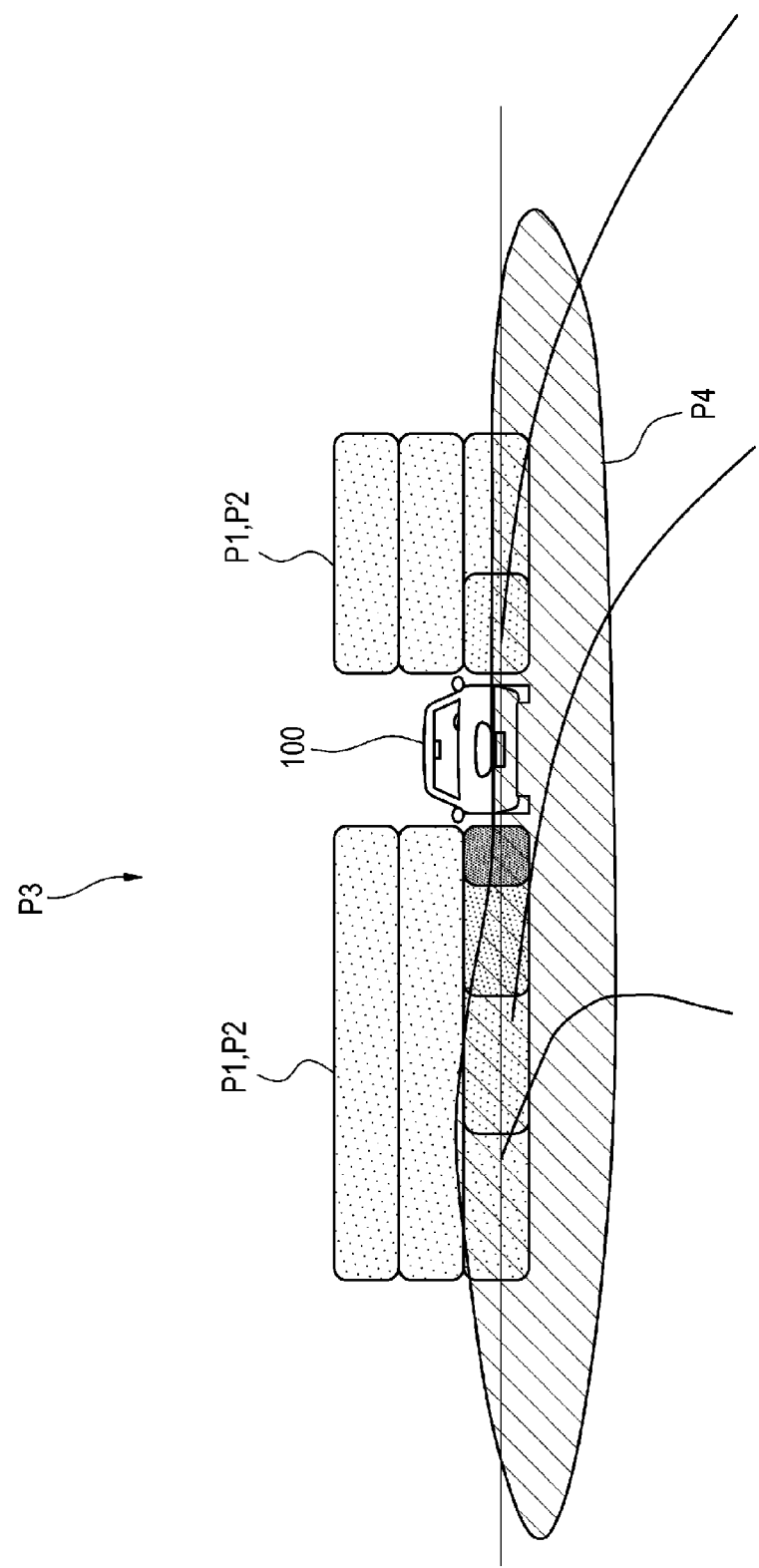
FIG. 11 is a view illustrating a light distribution pattern formed on the virtual vertical screen by the visible light irradiated to the front from a low beam lamp unit and the high beam lamp unit.

FIG. 11 illustrates a light distribution pattern P3 formed on the virtual vertical screen by the visible light irradiated to the front from the low beam lamp unit 42L and the high beam lamp unit 42H.

The light distribution pattern P3 of the visible light illustrated in FIG. 11 is formed by combining the visible light irradiated from the low beam lamp unit 42L and the high beam lamp unit 42H. That is, the light distribution pattern P3 is formed by combining a low beam light distribution pattern P4 of the visible light irradiated from the low beam lamp unit 42L and the high beam light distribution patterns P1 and P2 of the visible light irradiated from the high beam lamp unit 42H. The light distribution of the light distribution pattern P3 is controlled, for example, such that light is not irradiated to an upper portion of an oncoming vehicle 100 (a position of a driver of the oncoming vehicle 100) and its surrounding area in the area in front of the vehicle, by turning OFF each of the visible light LEDs 44-1 to 44-11 at timings corresponding to the areas. Therefore, it is possible to suppress glare light to the driver of the oncoming vehicle 100.

Figure 12:
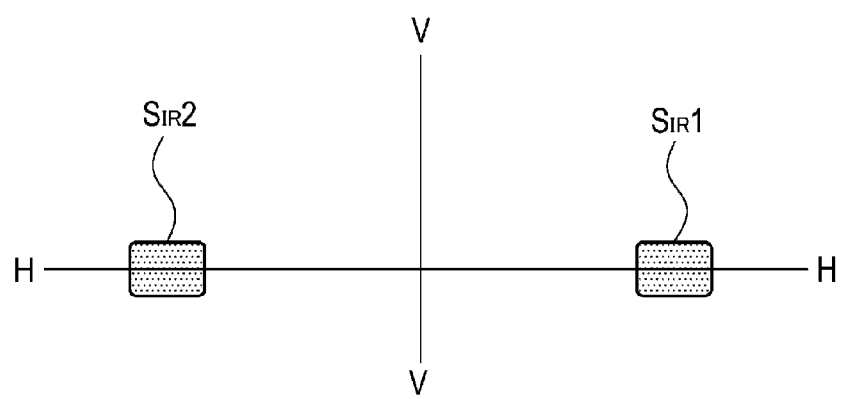
FIG. 12 is a view illustrating an image of spot light of infrared light formed on a virtual vertical screen by the infrared light irradiated from each infrared light emitting element provided on the first wiring substrate.
Figure 13:
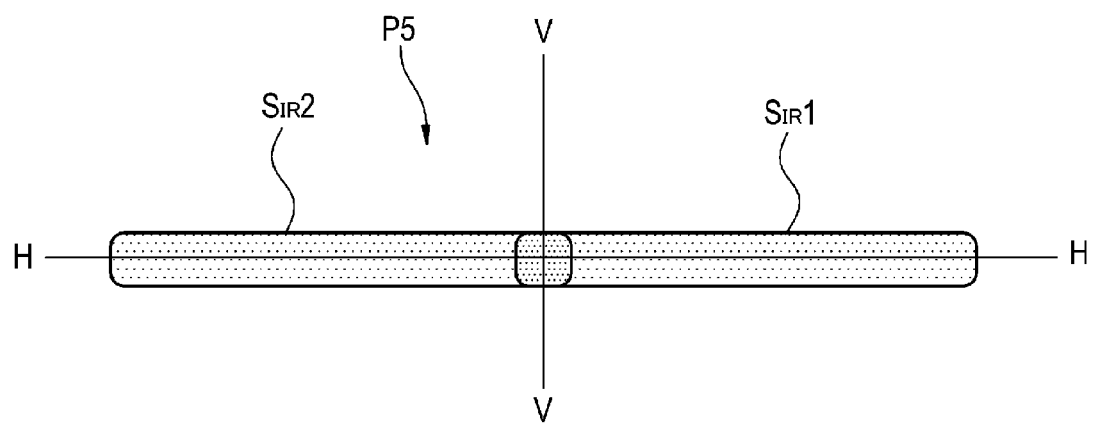
FIG. 13 is a view illustrating a light distribution pattern in a state where the infrared light irradiated from each visible light emitting element is scanned by rotation of the rotating reflector.

FIG. 12 is a view illustrating images of spot light of infrared light formed on the virtual vertical screen by the infrared light irradiated from each of the IR-LEDs 45-1 and 45-2 provided on the first wiring substrate 61. FIG. 13 is a view illustrating a light distribution pattern P5 in a state where the infrared light irradiated from each of the IR-LEDs 45-1 and 45-2 is scanned by the rotation of the rotating reflector 65.

The infrared light emitted from each of the IR-LEDs 45-1 and 45-2 is reflected by the rotating reflector 65, is inverted up and down and left and right by transmitting the first lens 67, and forms the images of the spot light illustrated in FIG. 12 on the virtual vertical screen. In FIG. 12, an image $S_{IR}1$ is an image of the spot light of the infrared light irradiated from the IR-LED 45-1, and an image $S_{IR}2$ is an image of the spot light of the infrared light irradiated from the IR-LED 45-2. The images $S_{IR}1$ and $S_{IR}2$ are irradiated to be spaced apart from each other by a certain distance on the horizontal line H-H on the virtual vertical screen.

When the images $S_{IR}1$ and $S_{IR}2$ of the spot light of the infrared light emitted from each of the IR-LEDs 45-1 and 45-2 are scanned in the left and right direction by the rotation of the rotating reflector 65, the light distribution pattern P5 illustrated in FIG. 13 is formed. The light distribution pattern P5 is formed on the horizontal line H-H. In regard to infrared light that is invisible light, it is unnecessary to consider glare light to a driver of an oncoming vehicle. As a result, the light distribution pattern P5 is a light distribution that substantially uniformly irradiates the entire area of the horizontal line H-H regardless of the control of the high beam light distribution patterns P1 and P2 of visible light.

The infrared light irradiated along the horizontal line H-H like the light distribution pattern P5 is reflected by an object (target object) present in front of the vehicle. The photo diode 47 included in the high beam lamp unit 42H receives the infrared light reflected by the object, and outputs it as a current signal. The current signal of the output infrared light is converted into a voltage signal by the current-voltage conversion•amplification circuit 54 and is further amplified, and then is sent to the measurement circuit 55. The measurement circuit 55 sends a signal related to the light receiving timing of the reflected light of the infrared light or the light intensity of the reflected light to the micro controller 50, based on the voltage signal sent from the current-voltage conversion•amplification circuit 54. The micro controller 50 obtains information such as the distance to the object, the shape of the object, and the material of the object, based on the signal (signal related to emitted light and returned light) related to the infrared light received from the measurement circuit 55. Therefore, the micro controller 50 may detect the presence of a pedestrian in front of the vehicle or an oncoming vehicle. Then, the micro controller 50 controls the turning-on/off of the visible light source 44 (visible light LEDs 44-1 to 44-11) so as not to apply glare light to the pedestrian in front of the vehicle or the oncoming vehicle detected based on the infrared light signal. Further, the micro controller 50 sends a signal related to information around the vehicle detected based on the infrared light signal to the vehicle controller 3. When the vehicle 1 is traveling in an automatic driving mode, the vehicle controller 3 may automatically generate at least one of a steering control signal, an accelerator control signal, or a brake control signal based on the surrounding environment information obtained from the micro controller 50.

Figure 14:
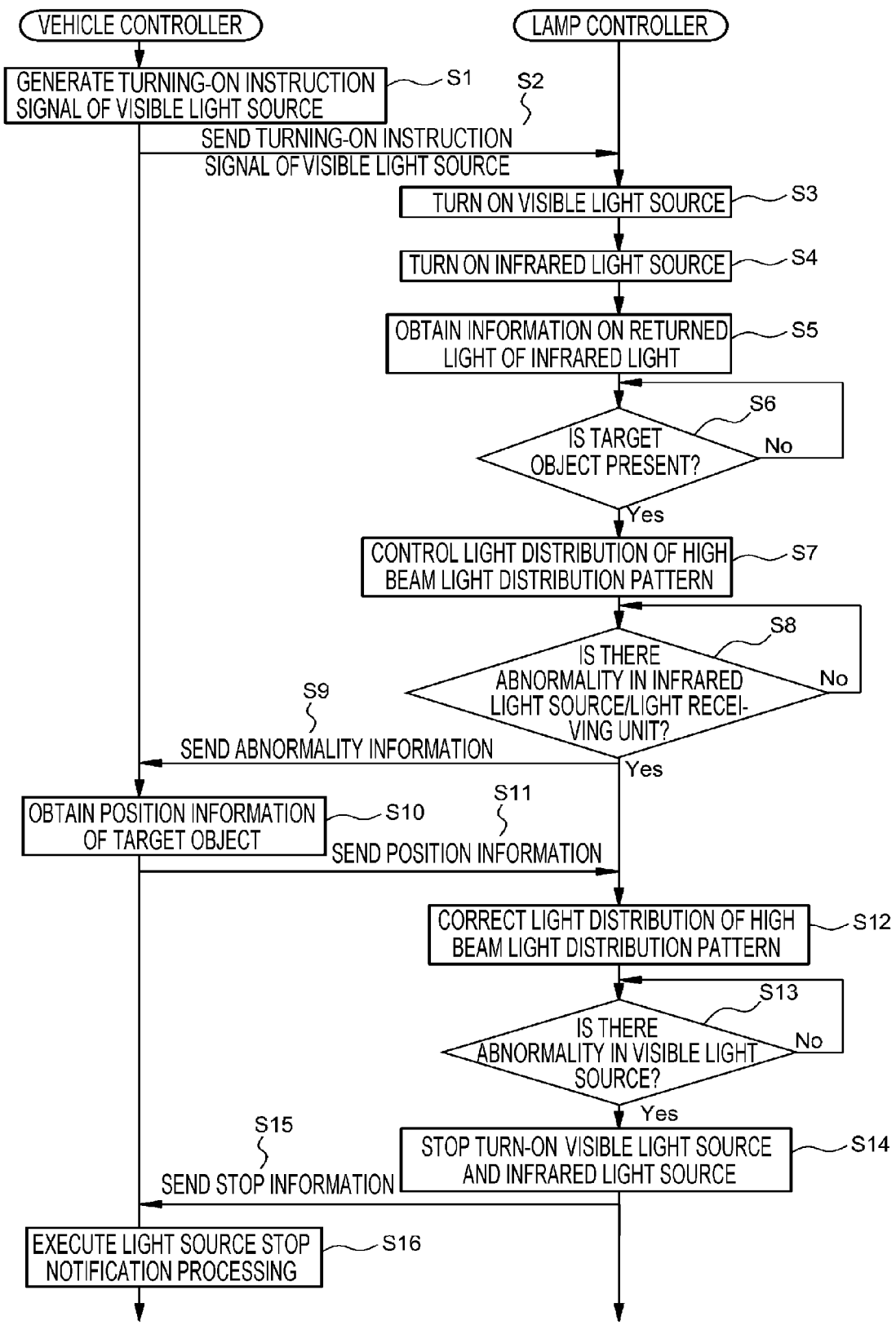
FIG. 14 is a flowchart illustrating an example of a control processing of a high beam light distribution pattern when an abnormality occurs in at least one of the infrared light source or the light receiving unit according to the present embodiment.
Figure 15:
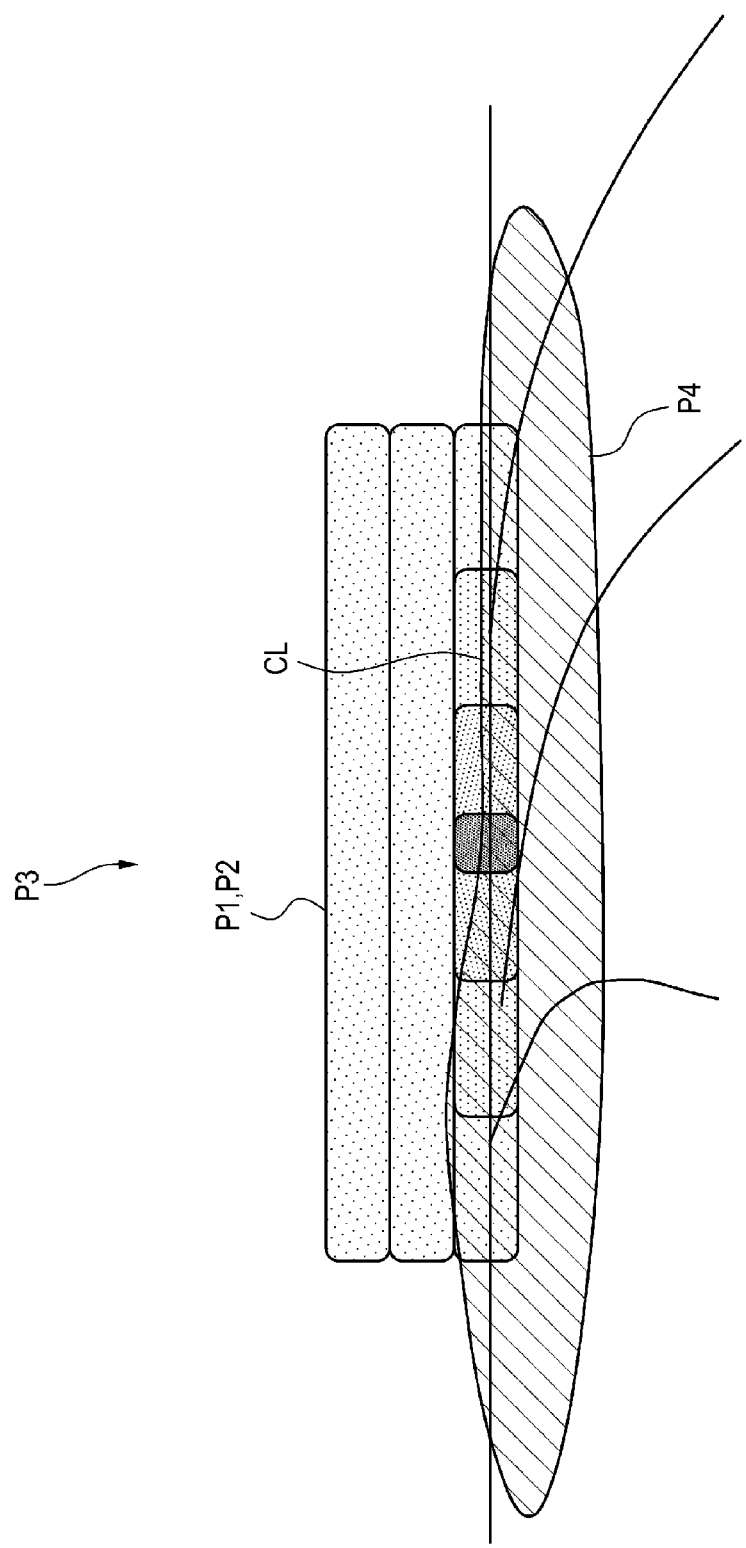
FIG. 15 is a view illustrating an example of a light distribution pattern formed on the virtual vertical screen in a state where a target object is not detected in front of the vehicle.
Figure 16:
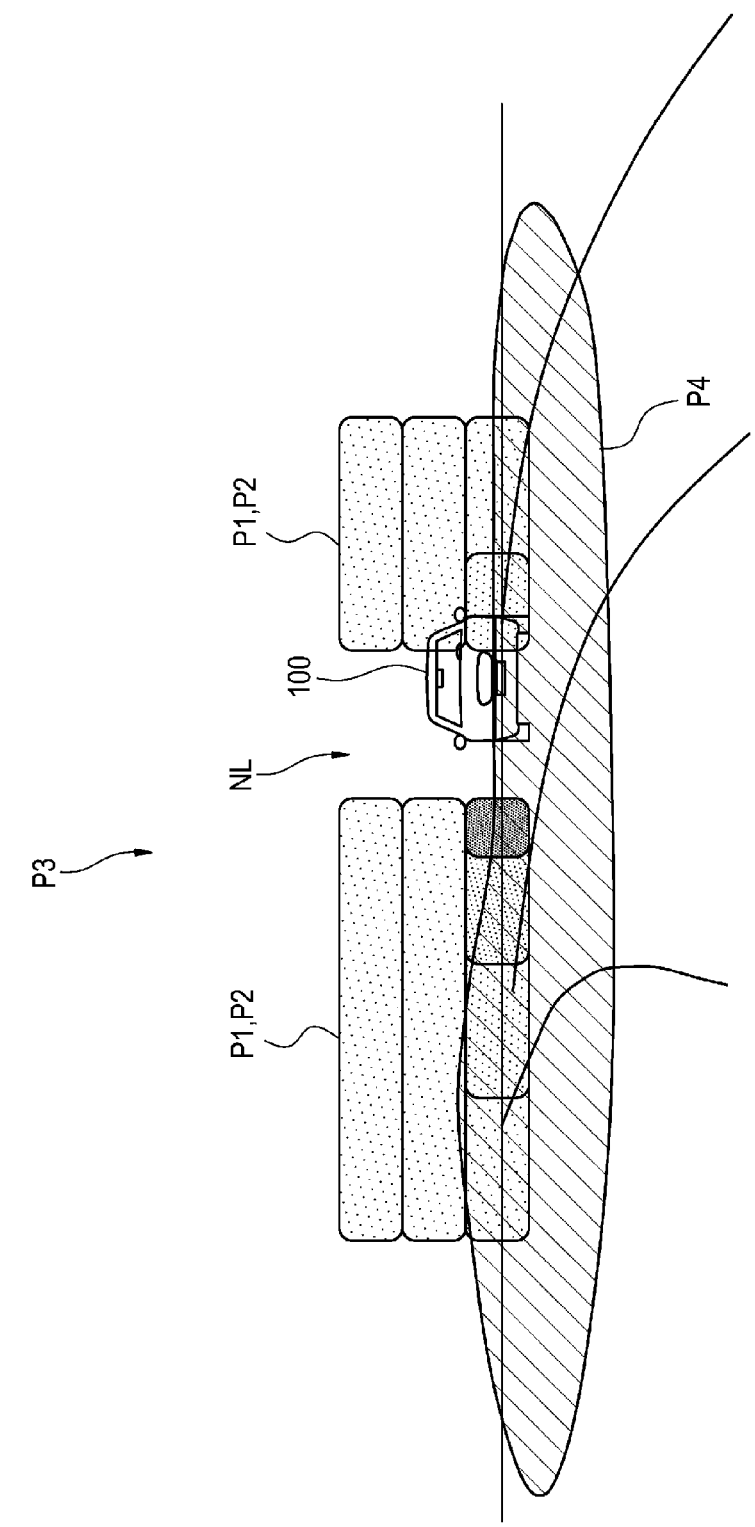
FIG. 16 is a view illustrating an example of a light distribution pattern when an abnormality occurs in the infrared light source or the light receiving unit in a state where a target object is detected.
Figure 17:
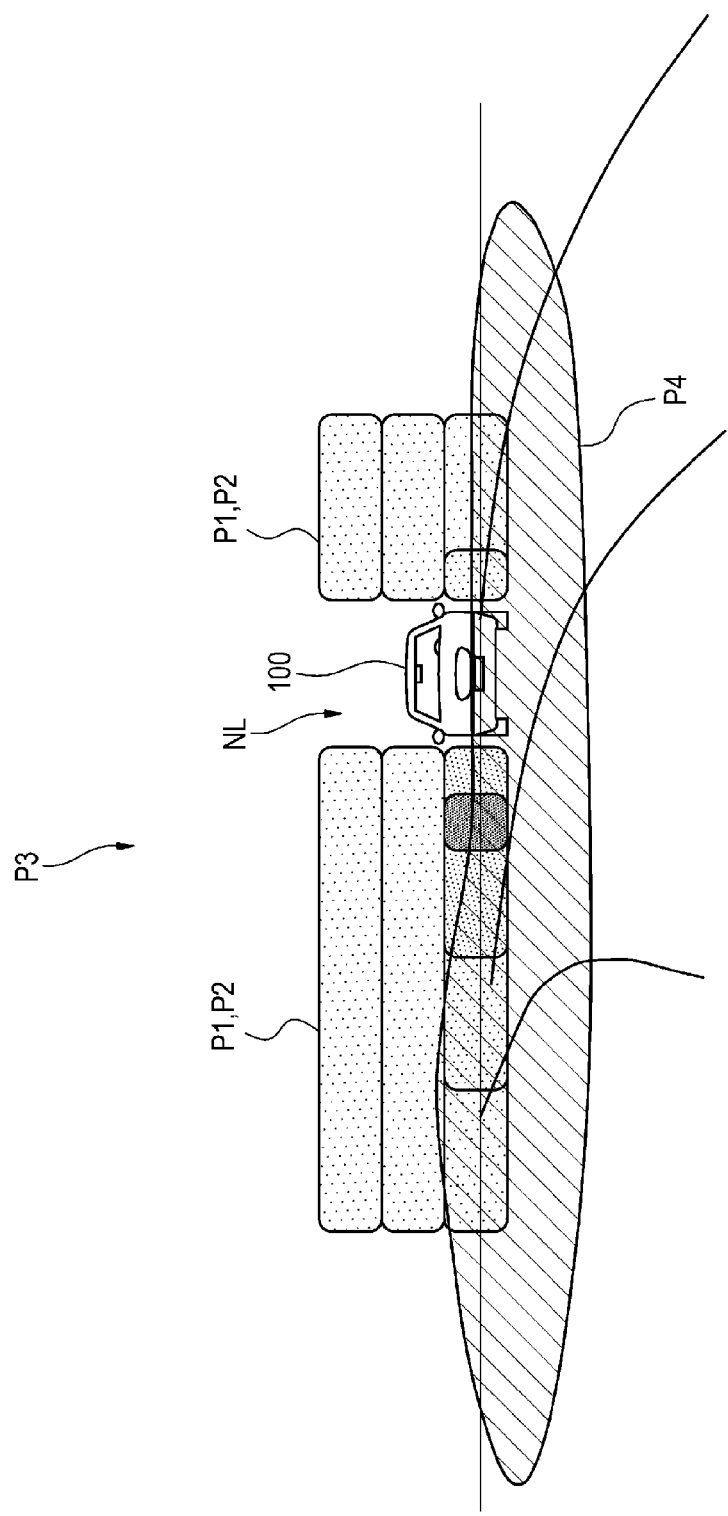
FIG. 17 is a view illustrating an example of a light distribution pattern in a state where position information of the target object is corrected.

Subsequently, an example of a control processing of the high beam light distribution pattern when an abnormality occurs in at least one of the infrared light source or the light receiving unit according to the present embodiment will be described with reference to FIG. 11, and FIGS. 14 to 17. FIG. 14 is a flowchart illustrating an example of the control processing of the high beam light distribution pattern when an abnormality occurs in at least one of the infrared light source or the light receiving unit. FIG. 15 is a view illustrating a light distribution pattern formed on the virtual vertical screen in a state where a target object is not detected in front of the vehicle. FIG. 16 is a view illustrating a light distribution pattern in a case where an abnormality occurs in the infrared light source 45 or the photo diode 47 in a state where the oncoming vehicle 100 is detected. FIG. 17 is a view illustrating a light distribution pattern in a state where the position information of the oncoming vehicle 100 is corrected.

As illustrated in FIG. 14, firstly, the vehicle controller 3 generates a turning-on instruction signal (step S1) that is an instruction signal to turn ON the visible light source 44 mounted on the lamp unit 42 (high beam lamp unit 42H), based on the input operation from a user, or the vehicle surrounding information obtained by the sensor 5 or the radar 7. Subsequently, the vehicle controller 3 sends the generated turning-on instruction signal of the visible light source 44 to the lamp controller 43 (step S2).

Subsequently, the lamp controller 43 turns ON the visible light source 44 mounted on the high beam lamp unit 42H, based on the turning-on instruction signal received from the vehicle controller 3 (step S3). As described above, the high beam light distribution patterns P1 and P2 are formed by combining the light distribution pattern P1 as illustrated in FIG. 8 and the light distribution pattern P2 as illustrated in FIG. 10, by scanning the visible light irradiated from the visible light source 44 in the left and right direction by the rotation of the rotating reflector 65. The light distribution pattern P3 illustrated in FIG. 15 is formed by combining the high beam light distribution patterns P1 and P2 with the low beam light distribution pattern P4 formed by the visible light irradiated from the low beam lamp unit 42L.

Subsequently, the lamp controller 43 turns ON the infrared light source 45 mounted on the high beam lamp unit 42H (step S4). As described above, the light distribution pattern P5 as illustrated in FIG. 13 on the horizontal line H-H is formed by scanning the infrared light irradiated from the infrared light source 45 in the left and right direction by the rotation of the rotating reflector 65.

Subsequently, the lamp controller 43 obtains information (returned light information) on returned light obtained by reflecting the infrared light irradiated from the infrared light source 45 by a target object around the vehicle from the photo diode 47 (step S5). Subsequently, the lamp controller 43 analyzes the obtained returned light information to detect whether or not a target object is present around the vehicle (step S6). When it is determined that a target object is present ("Yes" in step S6), the lamp controller 43 controls the light distribution of the high beam light distribution patterns P1 and P2 (step S7). Specifically, when the oncoming vehicle 100 is detected as a target object based on the returned light information, the lamp controller 43 obtains position information of the oncoming vehicle 100. The position information of the oncoming vehicle 100 includes, for example, a position or a size of the area corresponding to the oncoming vehicle 100. The lamp controller 43 controls the light distribution of the high beam light distribution patterns P1 and P2 as illustrated in FIG. 11, based on the position information of the obtained oncoming vehicle 100, such that light is not irradiated to the upper portion of the oncoming vehicle 100 (particularly, a position of a driver of the oncoming vehicle 100) and its surrounding area in the area in front of the vehicle, by turning OFF the visible light source 44 (each of the visible light LEDs 44-1 to 44-11) at the timings corresponding to the areas.

As described above, in steps S5 to S7, the presence or absence of a target object around the vehicle is detected based on the returned light of the infrared light emitted from the infrared light source 45, and based on the detection result, the light distribution of the high beam light distribution patterns P1 and P2 is controlled so as not to apply glare light to the detected target object. At this time, if an abnormality occurs in at least one of the infrared light source 45 or the photo diode 47, the detection accuracy of the target object based on the returned light information of the infrared light becomes low, and thus, the light distribution of the high beam light distribution patterns P1 and P2 may not be properly controlled. Specifically, as illustrated in FIG. 16, the actual position of the oncoming vehicle 100 and the position information of the oncoming vehicle 100 detected based on the returned light information may not coincide with each other, that is, a non-irradiated portion NL for not irradiating the area corresponding to the oncoming vehicle 100 in the high beam light distribution patterns P1 and P2 may not coincide with the area where the oncoming vehicle 100 is actually present. In this case, the high beam light distribution patterns P1 and P2 capable of applying glare light to the driver of the oncoming vehicle 100 may be formed.

Therefore, in the present embodiment, following the processing in step S7, the lamp controller 43 determines whether or not an abnormality occurs in at least one of the infrared light source 45 or the photo diode 47 (step S8). The lamp controller 43 determines that an abnormality occurs, for example, when the signal obtained from the photo diode 47 is out of a predetermined range. The occurrence of an abnormality in at least one of the infrared light source 45 or the photo diode 47 includes a case where an abnormality occurs not only in the infrared light source 45 or the photo diode 47, but also in the LED driver 51 configured to drive the infrared light source 45, the current-voltage conversion•amplification circuit 54, and the measurement circuit 55.

When it is determined that an abnormality occurs in at least one of the infrared light source 45 or the photo diode 47 ("Yes" in step S8), the lamp controller 43 generate information (abnormality information) on the abnormality in at least one of the infrared light source 45 or the photo diode 47, and sends the abnormality information to the vehicle controller 3 (step S9).

Subsequently, the vehicle controller 3 obtains position information of the target object from the vehicle surrounding information obtained by the camera 6 (visible light camera 6A and infrared light camera 6B) or the radar 7 mounted on the vehicle 1, based on the abnormality information received from the lamp controller 43 (step S10). In the example, the vehicle controller 3 obtains the position information of the oncoming vehicle 100 as the target object. Subsequently, the vehicle controller 3 sends the obtained position information of the target object to the lamp controller 43 (step S11).

Subsequently, the lamp controller 43 corrects the light distribution of the high beam light distribution patterns P1 and P2 based on the position information of the target object obtained from the vehicle controller 3 (step S12). Specifically, as illustrated in FIG. 17, the lamp controller 43 corrects the high beam light distribution patterns P1 and P2 such that the non-irradiated portion (light-shielded portion) NL of the high beam light distribution patterns P1 and P2 is matched to the position information of the oncoming vehicle 100 after the correction, based on the position information of the oncoming vehicle 100 obtained from the vehicle controller 3.

Subsequently, the lamp controller 43 determines whether or not an abnormality occurs in the visible light source 44 (step S13). When it is determined that an abnormality occurs in the visible light source 44 ("Yes" in step S13), the lamp controller 43 stops the turning-on of the infrared light source 45 together with the visible light source 44 (step S14). Then, the lamp controller 43 generates information (stop information) on the stop of the turning-on of the visible light source 44 and the infrared light source 45, and sends the stop information to the vehicle controller 3 (step S15).

Subsequently, the vehicle controller 3 executes a turn-on stop notification processing for informing the driver of the vehicle 1 that the turning-on of the visible light source 44 and the infrared light source 45 is stopped due to the occurrence of an abnormality in the visible light source 44 (step S16), based on the stop information received from the lamp controller 43, and ends the processing.

As described above, the high beam lamp unit 42H according to the present embodiment includes the visible light source 44 (an example of the first light source), the infrared light source 45 (an example of the second light source), the rotating reflector 65 configured to reflect the visible light irradiated from the visible light source 44 and the infrared light irradiated from the infrared light source 45 while being rotated, and to scan the visible light and the infrared light along the horizontal direction on the virtual vertical screen, the photo diode 47 configured to receive the infrared light emitted from the infrared light source 45 and reflected by the target object in the surrounding of the vehicle 1, and the lamp controller 43 configured to control the irradiation area (in the example, the high beam light distribution patterns P1 and P2) of the visible light emitted from the visible light source 44 based on (the returned light of) the infrared light received by the photo diode 47. Then, when it is determined that there is an abnormality in at least one of the infrared light source 45 or the photo diode 47, the lamp controller 43 is configured to control the high beam light distribution patterns P1 and P2 based on the vehicle surrounding information obtained from outside the high beam lamp unit 42H. As described above, when there is an abnormality in at least one of the infrared light source 45 or the photo diode 47, the position information of the target object obtained based on the returned light of the infrared light source obtained based on the returned light information of the infrared light may not be accurate. Therefore, in the present embodiment, when an abnormality occurs in at least one of the infrared light source 45 or the photo diode 47, the high beam light distribution patterns P1 and P2 are controlled based on information of the outside of the high beam lamp unit 42H, that is, the position information of the target object obtained by the vehicle controller 3 from the camera 6 or the radar 7. As a result, according to the configuration according to the present embodiment, it is possible to form the appropriate high beam light distribution patterns P1 and P2 even when an abnormality occurs in the infrared light source 45 or the photo diode 47.

Further, in the present embodiment, when it is determined that there is an abnormality in at least one of the infrared light source 45 or the photo diode 47, the lamp controller 43 is configured to notify the abnormality information to the vehicle controller 3. It is possible to reflect the abnormality information on the entire control of the vehicle 1 by delivering the abnormality information of the infrared light source 45 and/or the photo diode 47 to the vehicle controller 3.

Further, in the present embodiment, when it is determined that an abnormality occurs in the visible light source 44, the lamp controller 43 stops the irradiation of visible light from the visible light source 44 and stops the irradiation of infrared light from the infrared light source 45. When an abnormality occurs in the visible light source 44, visible light may be irradiated to the front of the vehicle 1 with inappropriate light distribution patterns P1 and P2, or the accuracy of sensing by infrared light may be lowered by the formation of the inappropriate light distribution patterns P1 and P2. Therefore, when an abnormality occurs in the visible light source 44, it is possible to prevent the formation of the inappropriate high beam light distribution patterns P1 and P2 or the sensing having a low accuracy by stopping not only the turning-on of the visible light source 44, but also the turning-on of the infrared light source 45, and thus, fail-safe may be achieved.

When it is determined that an abnormality occurs in at least one of the infrared light source 45 or the photo diode 47, the lamp controller 43 may control the low beam light distribution pattern P4 such that a cut off line CL (see FIG. 15) of the low beam light distribution pattern P4 formed on the virtual vertical screen by the visible light emitted from the low beam lamp unit 42L is blurred. When an abnormality occurs in the infrared light source 45 and/or the photo diode 47, since it is highly possible that the sensing of the target object becomes inaccurate, it is desired to blur the cut off line CL to prevent the occurrence of glare light.

When it is suspicious of the accuracy of the position information of the target object detected by the camera 6 or the radar 7, for example, when an abnormality occurs in the camera 6 or the radar 7, the lamp controller 43 may stop the turning-on of the visible light source 44 and the infrared light source 45. Further, when it is determined that an abnormality occurs any one of IR-LED of the IR-LEDs 45-1 and 45-2 that constitute the infrared light source 45, the IR-LED in which an abnormality occurs may be stopped.

In the above embodiment, the infrared light source 45 configured to irradiate infrared light is described as an example of an invisible light source, but the present disclosure is not limited thereto. For example, a light source that irradiates invisible light rays except infrared light such as ultraviolet light or X-ray may be adopted as the invisible light source.

In the above embodiment, the high beam lamp unit 42H included in the headlamp 4 is described as an example of a lamp, but it may be configured as a sign lamp such as a stop lamp or a tail lamp provided at the rear side of the vehicle. According to the configuration, the light distribution function as a stop lamp or a tail lamp and the function of detecting a target object at the rear of the vehicle may be compatible with a single lamp unit.

In the above embodiment, the lens 66 that transmits the visible light and the infrared light reflected by the rotating reflector 65 is provided in the high beam lamp unit 42H. However, it is not necessary to provide the lens 66. The visible light and the infrared light reflected by the rotating reflector 65 may be directly irradiated to the front of the high beam lamp unit 42H without passing through a lens.

The position of each LED that constitutes the visible light source 44 or the infrared light source 45 is not limited to the position illustrated in FIG. 3, and may be different from the position in FIG. 3.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A vehicle lamp comprising:
    a first light source configured to irradiate visible light to a surrounding of a vehicle;
    a second light source configured to irradiate infrared light in order to obtain surrounding information of the vehicle;
    a rotating reflector configured to be rotated while reflecting the visible light irradiated from the first light source and the infrared light irradiated from the second light source, and scan the visible light and the infrared light along a horizontal direction on a virtual vertical screen disposed at a predetermined distance from the vehicle;
    a light receiver configured to receive the infrared light irradiated from the second light source and reflected by a target object in the surrounding of the vehicle; and
    a controller configured to control an irradiation area of the visible light irradiated from the first light source based on the infrared light received by the light receiver,
    wherein, when determined that there is an abnormality in at least one of the second light source and the light receiver, the controller is configured to control the irradiation area based on the surrounding information of the vehicle obtained from an outside of the vehicle lamp, and
    when determined that there is an abnormality in the first light source, the controller stops irradiation of the visible light from the first light source and stops irradiation of the infrared light from the second light source.

2. The vehicle lamp according to claim 1, wherein, when determined that there is an abnormality in at least one of the second light source and the light receiver, the controller controls the irradiation area such that a cut off line formed on the virtual vertical screen by the visible light becomes blurred.

3. The vehicle lamp according to claim 1, wherein, when determined that there is an abnormality in at least one of the second light source and the light receiving unit, the controller is configured to notify abnormality information to a vehicle controller configured to control the entire vehicle.

4. The vehicle lamp according to claim 2, wherein, when determined that there is an abnormality in at least one of the second light source and the light receiving unit, the controller is configured to notify abnormality information to a vehicle controller configured to control the entire vehicle.

* * * * *